US012344038B2

(12) United States Patent
Paschall et al.

(10) Patent No.: US 12,344,038 B2
(45) Date of Patent: Jul. 1, 2025

(54) AIRCRAFT TIRE

(71) Applicant: Akron Polymer Solutions, Inc., Rancho Santa Margarita, CA (US)

(72) Inventors: Douglas Paschall, Rancho Santa Margarita, CA (US); Michael Brendan Rodgers, Leander, TX (US); Adel F. Halasa, Akron, OH (US)

(73) Assignee: AKRON POLYMER SOLUTIONS, INC, Rancho Santa Margarita, CA (US)

( * ) Notice: Subject to any disclaimer, the term of this patent is extended or adjusted under 35 U.S.C. 154(b) by 406 days.

(21) Appl. No.: 18/066,451

(22) Filed: Dec. 15, 2022

(65) Prior Publication Data

US 2023/0130750 A1    Apr. 27, 2023

Related U.S. Application Data

(63) Continuation-in-part of application No. 17/812,559, filed on Jul. 14, 2022, now Pat. No. 11,597,821.

(60) Provisional application No. 63/290,292, filed on Dec. 16, 2021, provisional application No. 63/228,389, filed on Aug. 2, 2021, provisional application No. 63/222,101, filed on Jul. 15, 2021, provisional application No. 63/222,103, filed on Jul. 15, 2021, provisional application No. 63/222,112, filed on Jul. 15, 2021.

(51) Int. Cl.
C08K 3/04 (2006.01)
B60C 11/00 (2006.01)
C08K 3/06 (2006.01)
C08K 3/22 (2006.01)
C08K 5/09 (2006.01)
C08K 5/18 (2006.01)
C08K 5/3437 (2006.01)
C08K 5/435 (2006.01)

(52) U.S. Cl.
CPC .......... B60C 11/0008 (2013.01); C08K 3/042 (2017.05); C08K 3/06 (2013.01); C08K 3/22 (2013.01); C08K 5/09 (2013.01); C08K 5/18 (2013.01); C08K 5/3437 (2013.01); C08K 5/435 (2013.01); C08K 2003/2296 (2013.01); C08K 2201/019 (2013.01)

(58) Field of Classification Search
CPC ... C08K 3/04; C08K 3/06; C08K 5/18; C08K 3/22; C08K 5/09
USPC .......................................................... 523/156
See application file for complete search history.

(56) References Cited

U.S. PATENT DOCUMENTS

| 7,999,027 | B2 | 8/2011 | Zhamu et al. | |
| 2002/0139461 | A1 | 10/2002 | Pyle et al. | |
| 2013/0150516 | A1 | 6/2013 | Lettow | |
| 2013/0296479 | A1* | 11/2013 | Martin | B82Y 30/00 524/575.5 |
| 2018/0215904 | A1* | 8/2018 | Cesareo | B60C 1/0016 |

FOREIGN PATENT DOCUMENTS

FR    3090668 A1    6/2020

OTHER PUBLICATIONS

Sun, Zhenyu et al., "High-Concentration Graphene Dispersions with Minimal Stabilizer: A Scaffold for Enzyme Immobilization for Glucose Oxidation," Chemistry Europe J., 2014, 20, 5752-5761, 11 pages.
Luna, Luis Augusto Visani et al., "Comparative in vitro toxicity of a graphene oxide-silver nanocomposite and the pristine counterparts toward macrophages," Journal of Nanobiotechnology, 2016, 14:12, 17 pages.

* cited by examiner

Primary Examiner — Deve V Hall
(74) Attorney, Agent, or Firm — Emerson Thomson Bennett®, LLC; Daniel A. Thomson

(57) ABSTRACT

An aircraft tire component is disclosed herein, including natural rubber, a peptizer, carbon black, graphene, wherein the graphene has a thickness of less than about 3.2 nm, a particle size of between about 50 nm and about 10 μm, and contains greater than about 95% carbon, aliphatic hydrocarbon resin, treated distillate aromatic extract, N-(1,3-dimethylbutyl)-N'-phenyl-1,4-benzenediamine, 2,2,4-trimethyl-1,2-dihydroquinoline, paraffinic wax, microcrystalline wax, zinc oxide, stearic acid, N-tert-butyl-benzothiazole sulfonamide, sulfur, and pre vulcanization inhibitor, wherein the aircraft tire component is chosen from the group consisting of a tread, an inner liner, and a sidewall.

15 Claims, 9 Drawing Sheets

Graphene Forms

Graphene Pristine without defects

Reduced Graphene Oxide

Graphene Oxide (GO)

Rapid Reduction in Permeability

Tortuous Path

Tortuous path phenomenon

Ametek-Mocon Instrument to Measure Permeability

Air Permeability to ASTM D1431

Improved Tear Strength and Adhesion at

Very Low Levels of Graphene

Improved Abrasion Resistance with Graphene

Improved Fatigue Resistance

Improved Adhesion at Very Low Levels of Graphene

Bias                              Radial

Rib tear

Tread cuts

Chunk-outs

Groove cracking

Tread Separation

Rib separation

AIRCRAFT TIRE

This application claims priority to U.S. Ser. No. 63/290,292, filed Dec. 16, 2021, which is incorporated herein by reference. This application is a continuation-in-part of U.S. Ser. No. 17/812,559, filed Jul. 14, 2022, which claims priority to U.S. Ser. No. 63/222,101, filed Jul. 15, 2021, U.S. Ser. No. 63/222,112, filed Jul. 15, 2021, U.S. Ser. No. 63/222,103, filed Jul. 15, 2021, and U.S. Ser. No. 63/228,389, filed Aug. 2, 2021, the contents of which are hereby incorporated by reference. Graphene is an allotrope of one of the several physical forms of carbon, other examples being graphite, fullerenes, and diamond, an allotrope being one of various forms an element may assume. At the atomic level, it is in the form of a sheet with a thickness nominally under about 1.0 nanometer and up to about 1 micron in diameter. Sheets of such dimensions when added to other materials to form composites facilitate increases in thermal and electrical conductivity and in the case of elastomer nanocomposites, improvements in hysteresis, compounding ingredient dispersion, aging resistance, and reductions in permeability.

BACKGROUND

At the molecular level, graphene has a hexagonal lattice structure of isolated, single-layer plates of graphene, which can be directly seen with transmission electron microscopy (TEM) as sheets of graphene suspended between bars of a metallic grid. Some of these images showed a rippling of the flat sheet, with amplitude of about one to three nanometers. Graphene has a theoretical specific surface area (SSA) of 2500 to 2700 $m^2/g$. This is much larger than for carbon black (typically less than 900 $m^2/g$) or for carbon nanotubes. With sheet thickness of less than about 1.0 nanometer, diameters of more than about 1 micron, graphene is thus much greater than that observed with other rubber nanocomposites such as those containing clays. There are essentially three forms of graphene, i) graphene oxide (GO), ii) reduced graphene oxide, and iii) pure graphene (FIG. 1). Pure graphene, or as sometimes referred to as pristine graphene, when exfoliated into monolayer sheets will be of an inert condition, i.e., no chemical functionality such as carboxylic acid, ketone, aldehyde, or hydroxyl groups on the graphene plate surface or plate edges observed in other graphene oxide derivatives (FIG. 1).

Graphene in polymer or rubber nanocomposites has been reported to have many unique properties such as antioxidant properties, reductions in permeability, thermal conductivity, electrical conductivity, and reduction in permeability. Abrasion resistance of rubber nanocomposites is also noted, suggesting better tire wear. In addition, improvement in hysteresis as measured by the loss modulus divided by the storage modulus or tangent delta has also been reported. In this instance such improvements can be reductions in whole tire rolling resistance with no loss in traction qualities.

In further viewing literature reports of rubber nanocomposites applications, the modern radial tire was in many respects made possible through the introduction and use of halobutyl rubber innerliners. Use of polymers, such as bromobutyl, in the innerliner compound enabled improvements in air retention performance, significant improvements in liner-to-tire casing adhesion and improvements in tire durability. This second generation technology represented a major advance over the use of first-generation liner technologies using regular butyl rubber found in tubes and liners of bias tires and early radial tire constructions. Since the introduction of halobutyl rubber there has been no significant advance in the composition of innerliner formulas used in the industry. Some of this might be due to the tolerances in properties that innerliner compounds must meet. For example, small increases in liner compound 300% modulus could lead to reduction in fatigue resistance and cracks with consequent loss in tire durability.

A nanocomposite is a polymer containing nano-sized dispersed particles such as graphene. In this section of the work rubber nanocomposites are based on isobutylene elastomers and graphene, under the commercial name, Prophene™, which has particles which have large aspect ratios, i.e., where the graphene plate thickness is in the order of up to about 1.0 micron but the plate width can be between about 0.3 nm (3A°) and about 1.0 nm. The graphene will be exfoliated in butyl rubber, i.e., separated into individual sheets, sets of sheets, or several sheets together, but not in an aggregated state or intercalated condition with sheets stacked upon one another.

BRIEF DESCRIPTION OF THE DRAWINGS

The present teachings are described hereinafter with reference to the accompanying figures.

DETAILED DESCRIPTION

Figure 1:
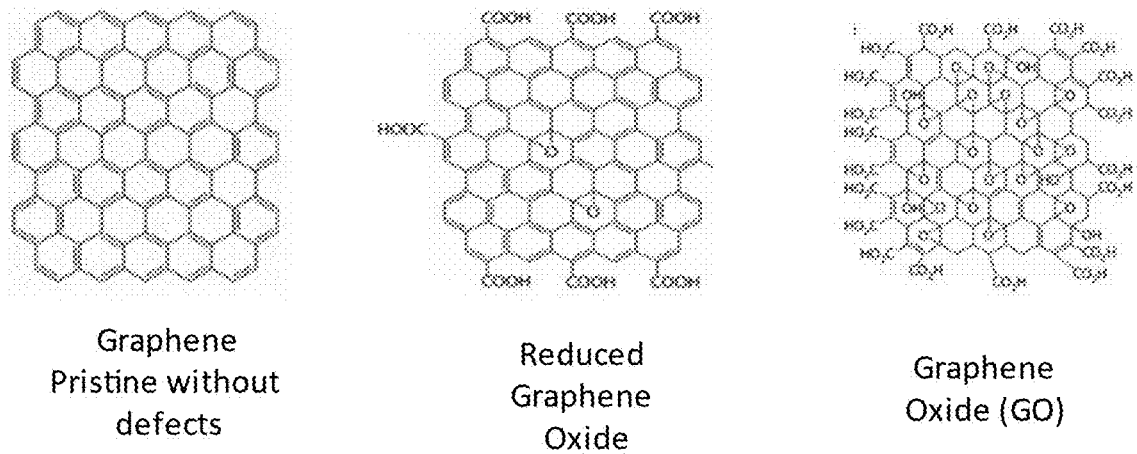
FIG. 1 shows different chemical structures of graphene.

The specific grade of graphene described herein is considered pristine, unlike all other commercial grades of graphene available.

Aircraft tires for the purpose of the present teaching can be classified in one of two ways: by application and by construction. Of the four fundamental types of tires by application, there are military, commercial, business, business jets and private/recreational, and rotary. Regarding construction, tires will either have a bias construction or radial construction.

Regardless of the tire construction or the type of aircraft tire, i.e., tire for either commercial, private or military use, four fundamental parameters govern tire performance capability, i) hysteresis and heat build-up during taxi, take-off and landing, ii) High centrifugal forces due to high speeds of rotation and take-off and landing, iii) tensile strength and compressive forces due to loads and impacts, and iv) abrasion and tread wear. Fundamental tire compound properties influencing these performance parameters are compound impermeability of the innerliner, all compounds tear strength and compound component to component adhesion, all compounds tensile strength, and compound abrasion resistance.

Compound compositions will change with tire manufacturer. However Table I shows the primary rubber polymer used in each general component in the aircraft tire.

TABLE I

Compound Rubber Polymer By Component

| Compound | Polymers | Carbon Black |
|---|---|---|
| Tread | NR | N220 |
| Cushion | NR | N330 |
| Shoulder Wedge | NR | N550 |
| Sidewall | NR, BR | N330 |
| Belts, Breakers | NR | N326 |
| Fabric Ply | NR | N326 |
| Fabric Ply | NR | N326 |
| Gum Strips | NR | N326 |
| Sidewall | NR, BR | N330 |
| Bead Filler | NR | N550 |
| Barrier/Squeegee | NR | N326, N660 |
| Innerliner | HIIR, BR | N660 |

In the present teaching, it is demonstrated that addition of graphene will allow improvements in the performance of many of these compounds with no trade off in other properties.

Compounding is the operation of bringing together all the ingredients required to mix a batch of rubber compound. Each component has a different mix of ingredients according to the properties required for that component. Mixing is the process of applying mechanical work to the ingredients in order to blend them into a homogeneous substance. Internal mixers are often equipped with two counter-rotating rotors in a large housing that shear the rubber charge along with the additives. The mixing is done in two or three stages to incorporate the ingredients in the desired order. The shearing action generates considerable heat, so both rotors and housing are water-cooled to maintain a temperature low enough to assure that vulcanization does not begin.

Graphene in this instance, described by the trade name Prophene™, is added to the rubber and mixed as noted above. Prophene™ will be added to a rubber formulation such as one based on butyl or halobutyl at levels from about 0.1 PHR to about 50.0 PHR, from about 0.5 PHR to about 10.0 PHR, and from about 0.1 PHR to about 4.0 PHR. Prophene™ is described in Table II

TABLE II

Properties of Pristine Prophene ™

| Form | Powder, dark grey, odorless |
|---|---|
| Carbon | >95% |
| Particle size | 150 nm to 10 μm |
| Moisture, Oxygen, Ash | <0.75 wt. %, <2.0 wt. %, <4.5 wt. %, respectively |
| Resistivity | <150 ohm cm |
| Particle (sheet) thickness) | <3.2 nm |
| Particle layers | <16 |
| Specific gravity | 2. gm/cubic centimeter |
| Surface area (specific) | 100 square m/gm |

Figure 2:
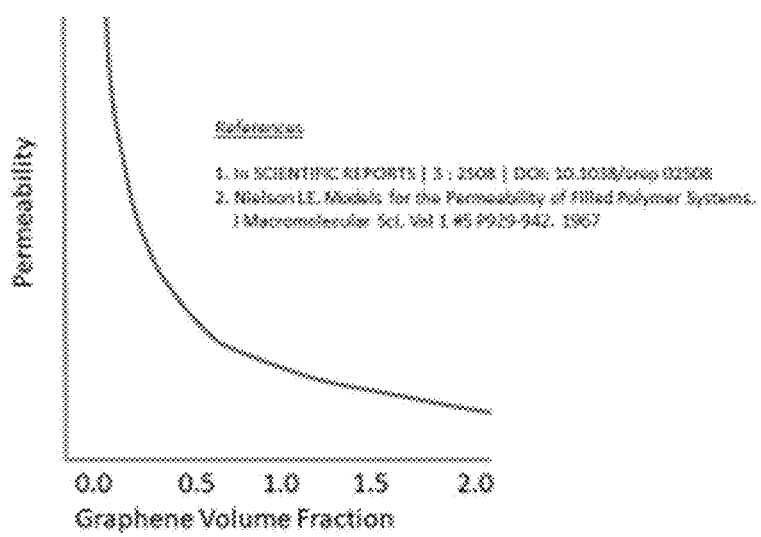
FIG. 2 shows a graph of reduction in permeability.

Compound permeability would follow a decrease, initially very large but though continuing to decrease, tapering as graphene levels increase. To those knowledgeable in such phenomenon, it is known to follow the Neilson model (see Neilson, J Macromol. Sci Chem A1 5P929 1967). Gas-permeability decreases with increasing graphene loading of only about 0.4 vol % in rubber composites. This percolation threshold is about 40 times lower than that for clay-based composites. According to the Nielsen model on gas permeability, the thickness of an individual graphene-based sheet dispersed in the graphene styrene-butadiene rubber (SBR) composite with 2.0 vol. % of GO was predicted to be 1.47 nm (FIG. 2).

Graphene, when added to a butyl or halobutyl rubber compound formulation, can be in various forms as follows:
1. As a powder;
2. In pastilles or pellets using wax as a carrier, aiding dust suppression;
3. In pre-weigh sealed low met temperature polyethylene bags; and
4. Melt or solution blended with a compatible polymer such as butyl rubber or halobutyl rubber and then compounded as part of the total rubber hydrocarbon content.

Figure 3:
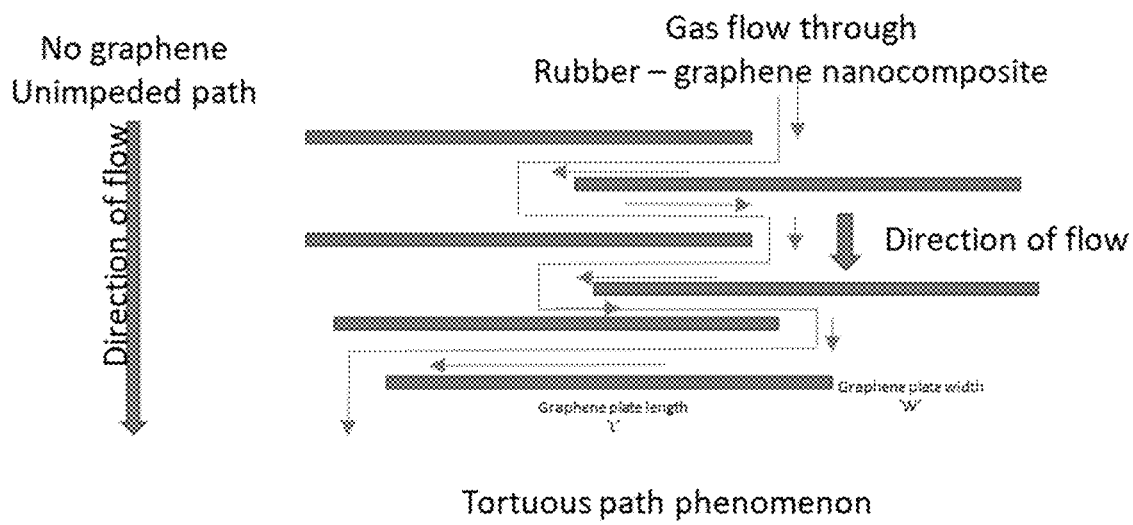
FIG. 3 shows the tortuous path phenomenon.

Graphene has an aspect ratio of near 1000, assuming the graphene plate thickness is about 1 nm. The plate length/diameter can be up to about 1 micron. The graphene can thus function as a barrier. The graphene exfoliates into sheets when added to the rubber compound, which improves the barrier properties when perpendicular alignment to the sheet direction is achieved. The graphene plates provide a barrier to oxygen and nitrogen migration, and moisture or water vapor molecules migrating through the liner compound of the tire or other product requiring such properties. Such gas molecule transport phenomenon is described as a "Tortuous Path" (FIG. 3). With continuing reference to FIG. 3, with the addition of graphene as a filler, there is no trade-off or loss in conventional processing and mechanical properties. Graphene has a very high aspect ratio. Small amounts have a large impact on reducing permeability. The nominal aspect ratio of graphene of up to 1000 compares with the typical aspect ratio of 20 for kaolin clay fillers. The clay fillers have to be added at about 40 PHR and also need a surfactant for compatibility. Due to the relatively large size of the graphene plates versus inorganic fillers, graphene can be added at about 1 PHR to about 2 PHR.

Measurement of Properties of Rubber Compositions

Mooney viscosity (ML1+4) at 100° C. was measured in accordance with ASTM D1646. Vulcanization kinetics and associated properties was measured by following the procedure in ASTM D5289. Tensile strength and associated data generated through measurement of tensile strength was determined following ASTM D412. Shore-A Hardness was measured following the method in ASTM D2240. Tear strength and adhesion were measured following ASTM D624. Oxygen permeability was measured using an Ametek Mocon OX-TRAN 2/22 permeability tester and following ASTM D3985. Air permeability determined according to the method in ASTM D1434

Example 1

Aircraft Tire Innerliner

Figure 4:
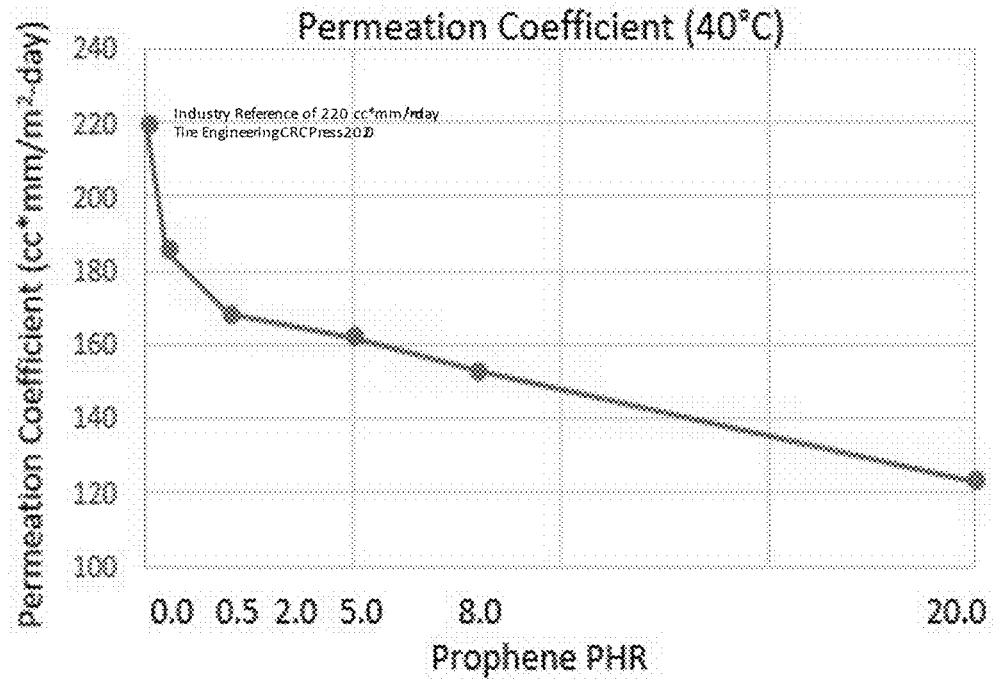
FIG. 4 shows a graph of permeation coefficient.
Figure 5:
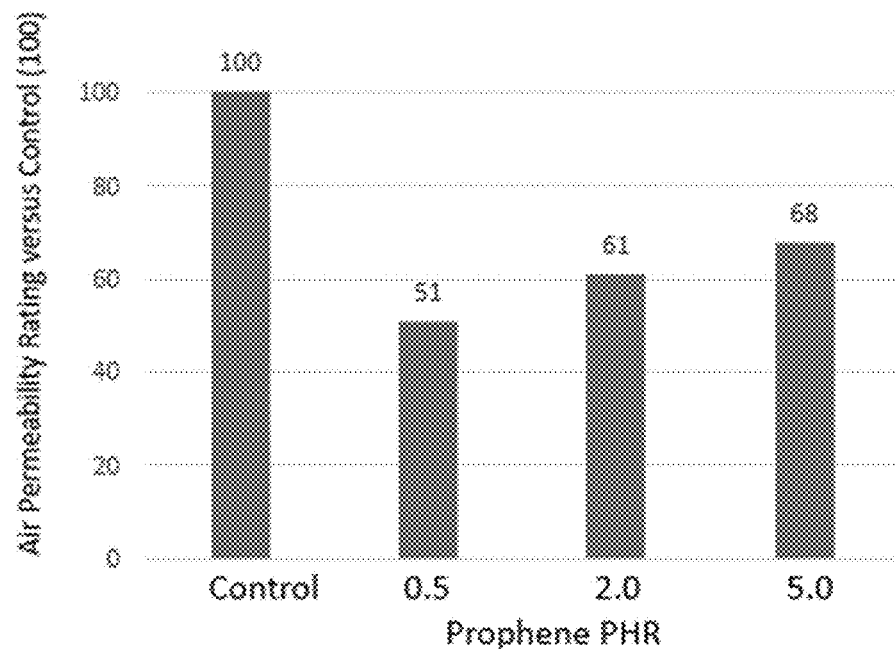
FIG. 5 shows a graph of air permeability.

To meet low temperature cracking resistance requirements aircraft tire innerliners have up to 20 PHR of polyisoprene or natural rubber. This results in a significant increase in permeability, air pressure loss in service, and increased tire inflation pressure maintenance requirements. Addition of graphene at very low levels will allow substantial improvement in inflation pressure retention (IPR) as shown in FIGS. 4 and 5. This terminology of inflation pressure maintenance and impact of natural rubber is described in the text, Tire Engineering, and introduction, CRC Press, Chapter 4.

TABLE III

Model Bromobutyl or Chlorobutyl Innerliner Compound for Aircraft Tires

| Type | Level (PHR) |
|---|---|
| Halobutyl Rubber | 80.0 |
| Natural rubber | 20.0 |
| Carbon Black (N660) | 50-60 |
| (e.g. Carbon Black, silicates) | |
| Resins | 4.0 |
| depends on application) | |
| Oils | 4.0-8.0 |
| Processing Aids | 3.0-10.0 |
| Zink Oxide | 1.00 |
| Stearic Acid | 1.00 |
| Accelerators | 2.00 |
| Sulfur | 0.50 |

Example 2

Aircraft Tire Natural Rubber Based Tread Compound

A model aircraft tire tread compound based on natural rubber tread is utilized. As shown in Table IV below, graphene is added at 0.5, 1.0, 2.0, 4.0, and 10.0 PHR. The compounds are mixed via laboratory two-stage mix process using BR scale Banbury. The addition of graphene to the aircraft tire tread does not shift the viscosity, as well as no change in compound processing or vulcanization kinetics.

Figure 6:
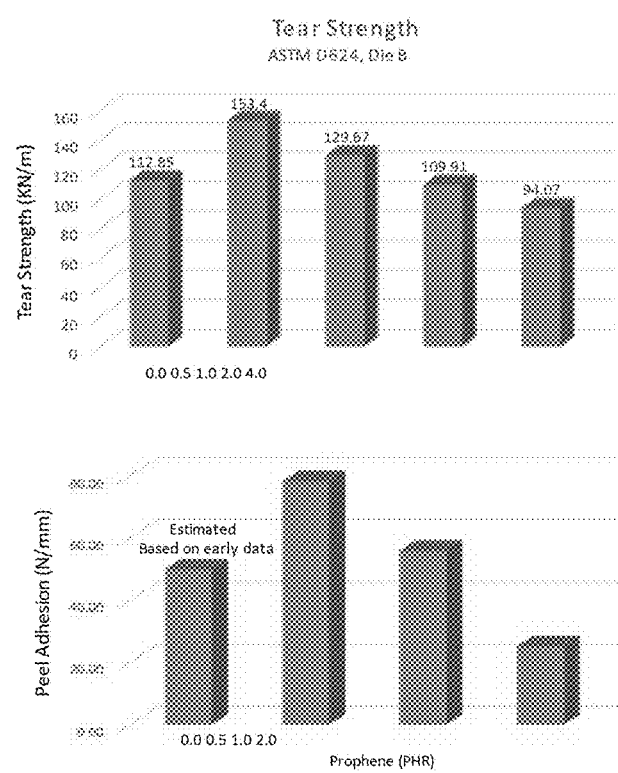
FIG. 6 shows a graph of improved tear strength and adhesion.
Figure 7:
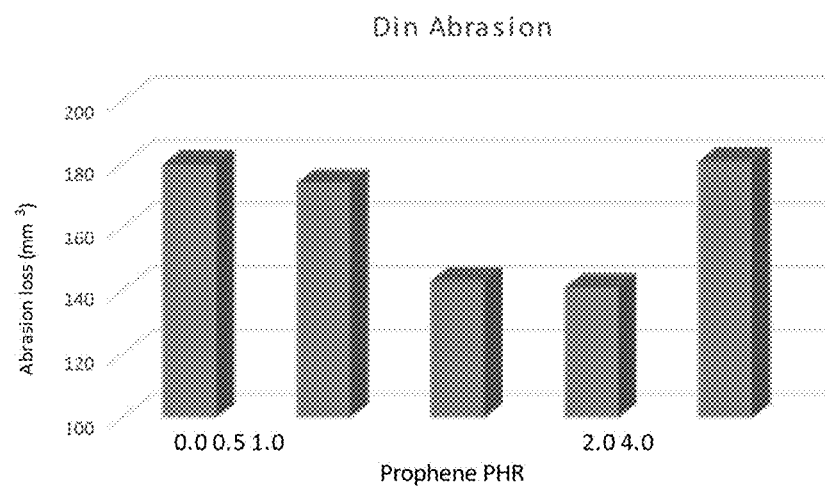
FIG. 7 shows a graph of improved abrasion resistance.
Figure 8:
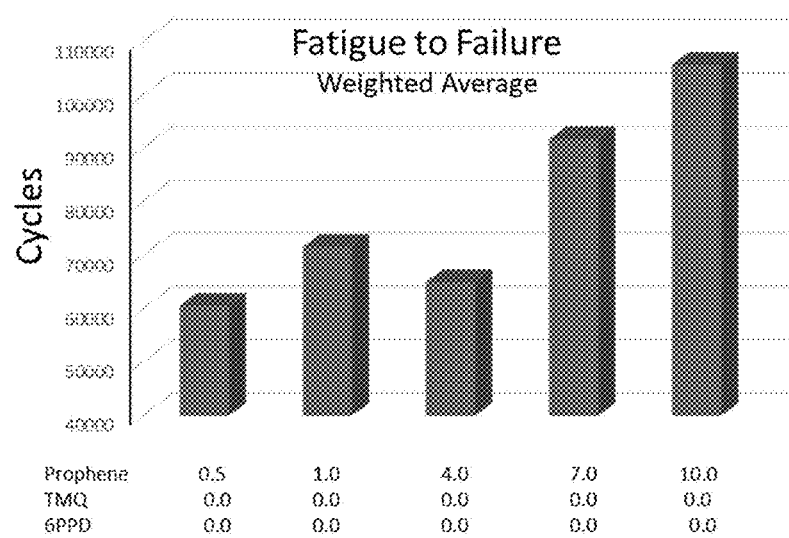
FIG. 8 shows a graph of improved fatigue resistance.
Figure 9:
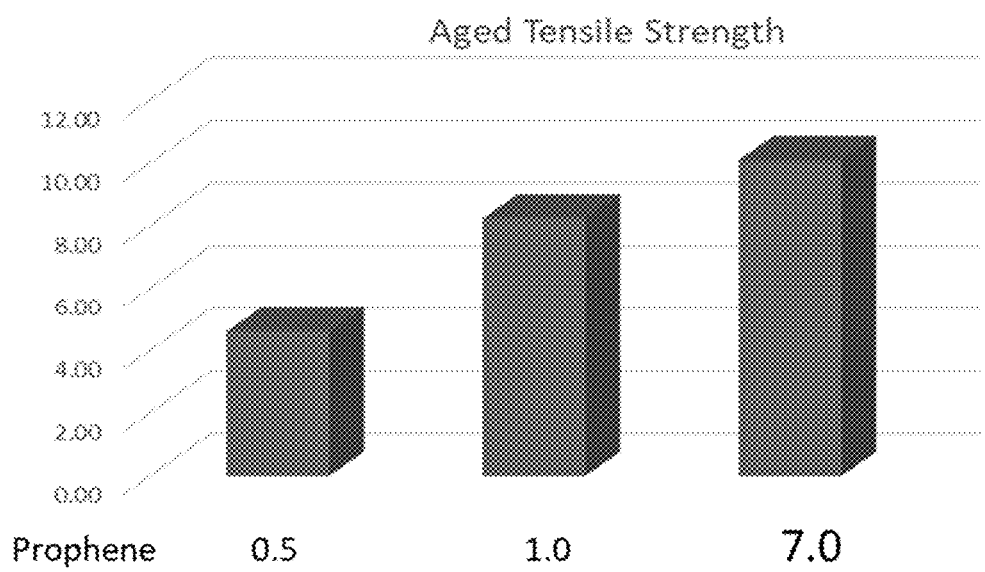
FIG. 9 shows a graph of aged tensile strength.
Figure 10:
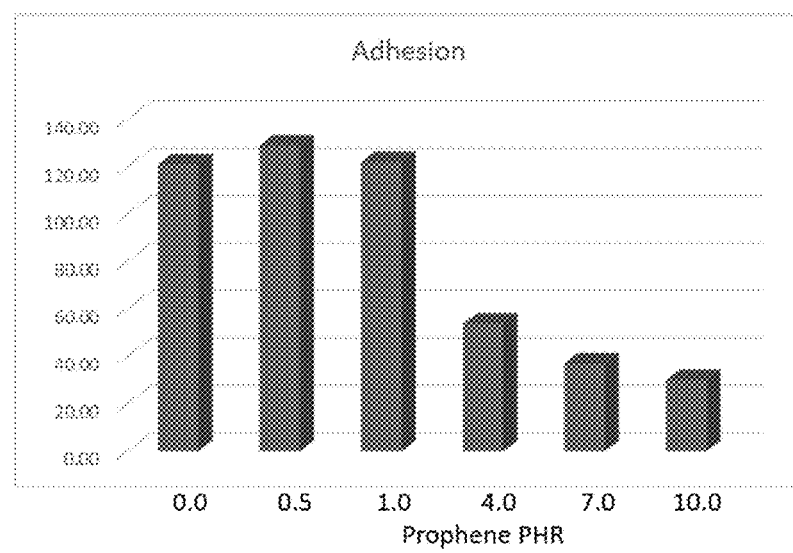
FIG. 10 shows a graph of improved adhesion.
Figure 11:
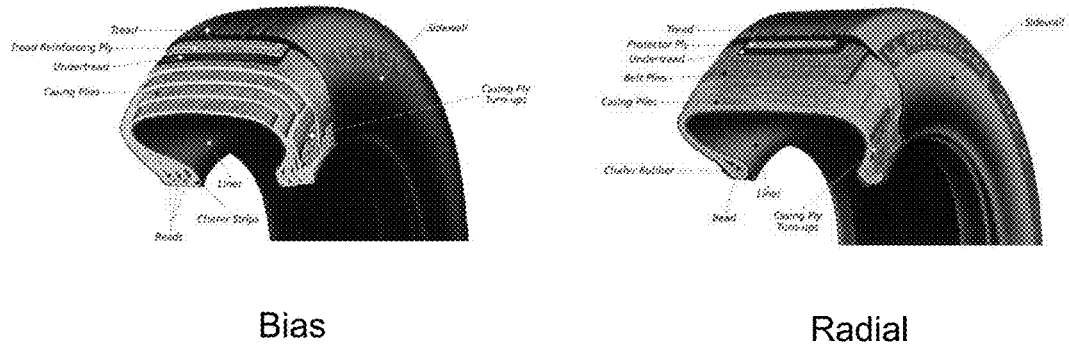
FIG. 11 shows a cutaway view of radial and bias tire constructions.
Figure 12:
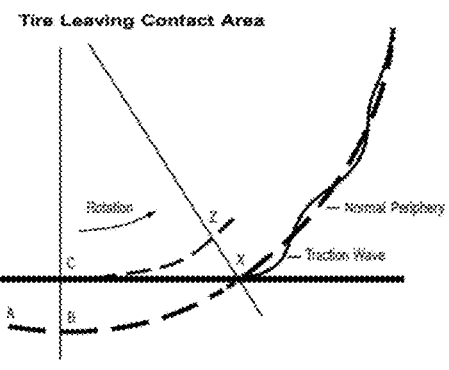
FIG. 12 shows a graph of tire leaving contact area.
Figure 13:
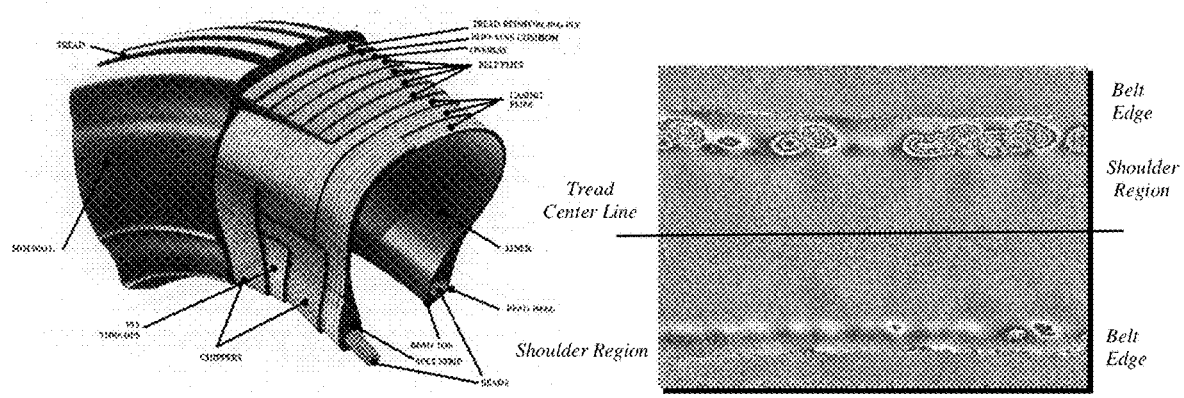
FIG. 13 shows a cutaway view of the tread and a high resolution photograph of tread.
Figure 14:
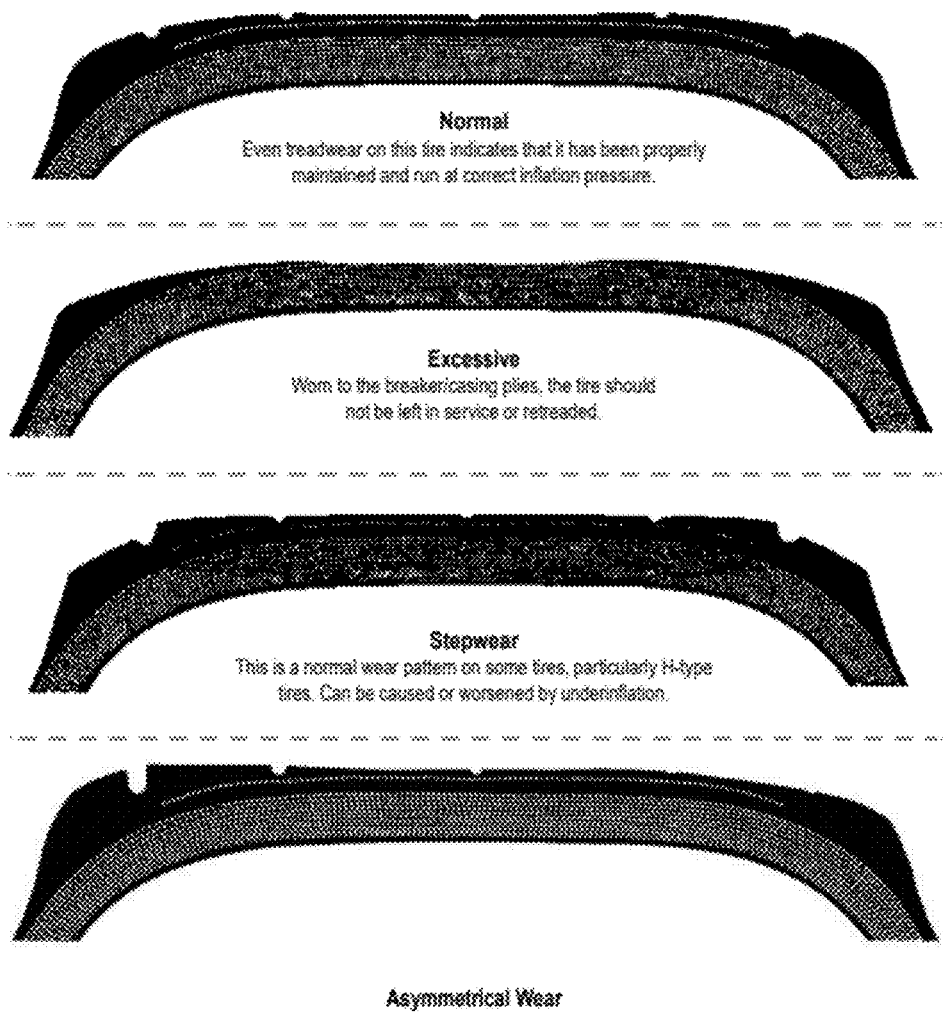
FIG. 14 shows examples of treadwear patterns.
Figure 15:
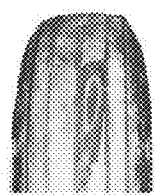
FIG. 15 shows different types of tire wear.
Figure 15:
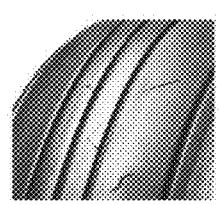
Figure 15:
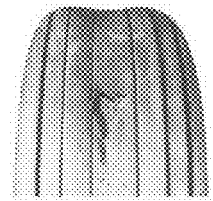
Figure 15:
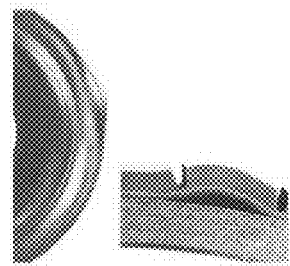
Figure 15:
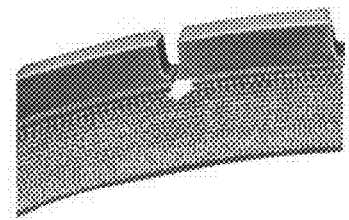
Figure 15:
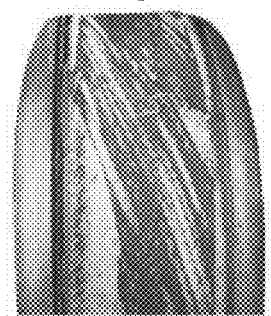
Figure 15:
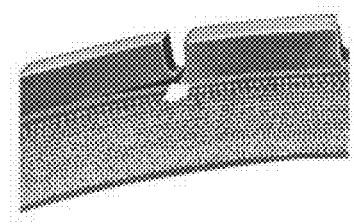

FIGS. 6 and 7 show much improved aircraft tire tread compound abrasion resistance and tear strength with small additions of graphene.

TABLE IV

Aircraft Tire Tread Compound Formulation

| Compound | Grade | 1 | 2 | 3 | 4 | 5 | 6 |
|---|---|---|---|---|---|---|---|
| Natural Rubber | TSR20, RSS2 | 100.00 | 100.00 | 100.00 | 100.00 | 100.00 | 100.00 |
| Peptizer (Renecit 11) | N121, Alter: | 0.10 | 0.10 | 0.10 | 0.10 | 0.10 | 0.10 |
| Carbon Black (N121) | N234 | 50.00 | 50.00 | 50.00 | 50.00 | 50.00 | 50.00 |
| Graphene | | 0.00 | 0.50 | 1.00 | 2.00 | 4.00 | 10.00 |
| Escorez 1102 | | 2.00 | 2.00 | 2.00 | 2.00 | 2.00 | 2.00 |
| TDAE (aromatic oil) | | 3.00 | 3.00 | 3.00 | 3.00 | 3.00 | 3.00 |
| 6PPD | | 2.50 | 2.50 | 2.50 | 2.50 | 2.50 | 2.50 |
| TMQ | | 1.50 | 1.50 | 1.50 | 1.50 | 1.50 | 1.50 |
| Paraffin wax | | 1.00 | 1.00 | 1.00 | 1.00 | 1.00 | 1.00 |
| Microcrystalline wax | | 1.00 | 1.00 | 1.00 | 1.00 | 1.00 | 1.00 |
| Zinc Oxide | | 4.00 | 4.00 | 4.00 | 4.00 | 4.00 | 4.00 |
| Stearic acid | | 2.00 | 2.00 | 2.00 | 2.00 | 2.00 | 2.00 |
| TBBS | | 1.00 | 1.00 | 1.00 | 1.00 | 1.00 | 1.00 |
| Sulfur | | 1.00 | 1.00 | 1.00 | 1.00 | 1.00 | 1.00 |
| PVI | | 0.20 | 0.20 | 0.20 | 0.20 | 0.20 | 0.20 |

TABLE V

Processing data

| | | 1 | 2 | 3 | 4 | 5 | 6 |
|---|---|---|---|---|---|---|---|
| Mooney Viscosity | ML1 + 4 | 95.14 | 87.93 | 94.32 | 96.08 | 86.60 | 89.26 |
| Mooney Peak ML1 + 4 | 100° C. | 61.63 | 61.66 | 62.20 | 62.20 | 61.06 | 61.69 |
| Aged Mooney Viscosity | 7 days | 111.60 | 95.40 | 99.90 | 98.80 | 100.40 | 94.80 |
| Mooney Peak ML1 + 4 | 100° C. | 61.70 | 61.50 | 62.00 | 62.10 | 61.30 | 62.00 |
| MDR Rheometer | Temperature | 160° C. | 160° C. | 160° C. | 160° C. | 160° C. | 160° C. |
| Arc | degrees | 0.5 | 0.5 | 0.5 | 0.5 | 0.5 | 0.5 |
| MH | | 9.67 | 9.56 | 9.89 | 9.77 | 9.67 | 10.05 |
| ML | | 1.85 | 1.75 | 1.9 | 1.81 | 1.78 | 1.86 |
| Delta Torque | | 7.82 | 7.81 | 7.99 | 7.96 | 7.89 | 8.19 |
| ts1 | | 3.04 | 3.03 | 3.04 | 3.04 | 3.08 | 2.97 |
| Torque at t10 | | 2.63 | 2.53 | 2.70 | 2.61 | 2.57 | 2.68 |
| Torque at t50 | | 5.76 | 5.66 | 5.90 | 5.79 | 5.73 | 5.96 |
| Torque at t90 | | 8.89 | 8.78 | 9.09 | 8.97 | 8.88 | 9.23 |
| t10 | | 2.55 | 2.45 | 2.65 | 2.52 | 2.45 | 2.66 |
| t50 | | 4.47 | 4.53 | 4.51 | 4.50 | 4.48 | 4.51 |
| t90 | | 6.73 | 6.76 | 6.81 | 6.67 | 6.88 | 6.91 |
| CRI | | 23.92 | 23.20 | 24.04 | 24.10 | 22.57 | 23.53 |

TABLE VI

Compound Properties

| Compound | Grade | 1 ERTNB10-76-1 | 2 ERTNB10-76-2 | 3 ERTNB10-76-3 | 4 ERTNB10-76-4 | 5 ERTNB10-76-5 | 6 ERTNB10-76-6 |
|---|---|---|---|---|---|---|---|
| Natural Rubber | TSR20, RSS2 | 100.00 | 100.00 | 100.00 | 100.00 | 100.00 | 100.00 |
| Peptizer (Renecit 11) | | 0.10 | 0.10 | 0.10 | 0.10 | 0.10 | 0.10 |
| Carbon Black | N121, | 50.00 | 50.00 | 50.00 | 50.00 | 50.00 | 50.00 |
| Graphene | | 0.00 | 0.50 | 1.00 | 2.00 | 4.00 | 10.00 |
| Tensile Strength: ASTM D412 Die C | | | | | | | |
| Tensile Strength | MPa | 26.00 | 27.00 | 26.00 | 26.60 | 26.70 | 25.00 |
| Elongation | % | 568 | 565 | 577 | 593 | 583 | 519 |
| 50% modulus | MPa | 1.18 | 1.15 | 1.20 | 1.23 | 1.35 | 1.60 |
| 100% modulus | MPa | 2.10 | 2.00 | 2.10 | 2.20 | 2.50 | 3.10 |
| 200% modulus | MPa | 5.90 | 5.90 | 5.90 | 5.80 | 6.50 | 7.40 |
| 300% modulus | MPa | 11.30 | 11.40 | 11.50 | 11.00 | 11.90 | 13.00 |
| 1" strip Tensile Strength | | | | | | | |
| Tensile Strength | MPa | 10.94 | 12.44 | 11.35 | 12.29 | 13.59 | 15.40 |
| Elongation | % | 296 | 329 | 312 | 322 | 346 | 343 |
| 50% modulus | MPa | 1.09 | 1.12 | 1.15 | 1.19 | 1.23 | 1.60 |
| 100% modulus | MPa | 1.92 | 2.01 | 2.02 | 2.18 | 2.25 | 3.20 |
| 200% modulus | MPa | 5.70 | 5.76 | 5.58 | 5.98 | 5.90 | 7.60 |
| 300% modulus | MPa | | 10.95 | 10.85 | 11.19 | 11.12 | 13.00 |
| Hardness | Shore A | 59 | 58 | 60 | 59 | 60 | 63 |
| Tear Strength | KN/m | 112.85 | 153.4 | 129.67 | 109.91 | 94.07 | 84.37 |
| Strebler (hot) | lbf/in | 516.4 | 439.6 | 314.4 | 142.0 | 80.3 | 37.7 |

Example 3

Aircraft Tire Sidewall

A model aircraft tire sidewall formulation was prepared with varying levels of Graphene.

TABLE VII

| Compound Material | Grade | 1 ERTNB10-115-1 PHR | 2 ERTNB10-115-2 | 3 ERTNB10-115-3 | 4 ERTNB10-115-4 | 5 ERTNB10-115-5 |
|---|---|---|---|---|---|---|
| Natural Rubber | TSR20 | 50.00 | 50.00 | 50.00 | 50.00 | 50.00 |
| Polybutadiene | | 50.00 | 50.00 | 50.00 | 50.00 | 50.00 |
| Prophene | | 0.00 | 0.00 | 0.50 | 1.00 | 4.00 |
| Carbon Black | N330 | 45.00 | 45.00 | 45.00 | 45.00 | 45.00 |
| Process Oil | TDAE | 3.50 | 3.50 | 3.50 | 3.50 | 3.50 |
| Paraffin Wax | | 2.00 | 2.00 | 2.00 | 2.00 | 2.00 |
| Microcrystalline Wax | | 1.00 | 1.00 | 1.00 | 1.00 | 1.00 |
| Tackifying Resin | Escorez 1102 | 2.00 | 2.00 | 2.00 | 2.00 | 2.00 |
| TMQ | | 1.50 | 0.00 | 0.00 | 0.00 | 0.00 |
| 6PPD | | 4.50 | 0.00 | 0.00 | 0.00 | 0.00 |
| Zinc Oxide | | 1.00 | 1.00 | 1.00 | 1.00 | 1.00 |
| Stearic Acid | | 1.00 | 1.00 | 1.00 | 1.00 | 1.00 |

TABLE VII-continued

| TBBS | | 1.00 | 1.00 | 1.00 | 1.00 | 1.00 |
|---|---|---|---|---|---|---|
| Sulfur | | 1.00 | 1.00 | 1.00 | 1.00 | 1.00 |
| Retarder | PVI | 0.25 | 0.25 | 0.25 | 0.25 | 0.25 |
| Total PHR | | 163.75 | 157.75 | 158.25 | 158.75 | 161.75 |

| Compound Material | Grade | 6 ERTNB10-115-6 | 7 ERTNB10-115-7 | 8 ERTNB10-115-8 | 9 ERTNB10-115-9 |
|---|---|---|---|---|---|
| Natural Rubber | TSR20 | 50.00 | 50.00 | 50.00 | 50.00 |
| Polybutadiene | | 50.00 | 50.00 | 50.00 | 50.00 |
| Prophene | | 7.00 | 10.00 | 4.50 | 4.50 |
| Carbon Black | N330 | 45.00 | 45.00 | 45.00 | 45.00 |
| Process Oil | TDAE | 3.50 | 3.50 | 3.50 | 3.50 |
| Paraffin Wax | | 2.00 | 2.00 | 2.00 | 2.00 |
| Microcrystalline Wax | | 1.00 | 1.00 | 1.00 | 1.00 |
| Tackifying Resin | Escorez 1102 | 2.00 | 2.00 | 2.00 | 2.00 |
| TMQ | | 0.00 | 0.00 | 1.50 | 1.50 |
| 6PPD | | 0.00 | 0.00 | 4.50 | 0.00 |
| Zinc Oxide | | 1.00 | 1.00 | 1.00 | 1.00 |
| Stearic Acid | | 1.00 | 1.00 | 1.00 | 1.00 |
| TBBS | | 1.00 | 1.00 | 1.00 | 1.00 |
| Sulfur | | 1.00 | 1.00 | 1.00 | 1.00 |
| Retarder | PVI | 0.25 | 0.25 | 0.25 | 0.25 |
| Total PHR | | 164.75 | 167.75 | 168.25 | 163.75 |

Improvements were observed in fatigue resistance and aged tensile strength, both desirable properties in aircraft tire sidewalls. Similarly, adhesion improved which has an immediate impact on improvement of tire durability.

With reference to FIGS. 12-15, heavy loads and high speeds contribute to strong centrifugal forces. The tire is deflected in the footprint due to load. As the rotating tire exits the runway contact area, a traction wave is generated as the tire returns to its natural shape. Stress can cause separation and the traction wave can cause groove cracking and rib under-cutting.

Clause 1—An aircraft tire tread, inner liner, and/or sidewall including natural rubber, a peptizer, carbon black, graphene, wherein the graphene has a thickness of less than about 3.2 nm, a particle size of between about 50 nm and about 10 μm, and contains greater than about 95% carbon, aliphatic hydrocarbon resin, treated distillate aromatic extract, N-(1,3-dimethylbutyl)-N'-phenyl-1,4-benzenediamine, 2,2,4-trimethyl-1,2-dihydroquinoline, paraffinic wax, microcrystalline wax, zinc oxide, stearic acid, N-tert-butyl-benzothiazole sulfonamide, sulfur, and pre vulcanization inhibitor.

Clause 2—An aircraft tire tread, inner liner, and/or sidewall including natural rubber, carbon black, and graphene, wherein the graphene has a thickness of less than about 3.2 nm, a particle size of between about 50 nm and about 10 μm, and contains greater than about 95% carbon.

Clause 3—The aircraft tire tread, inner liner, and/or sidewall of clause 2, wherein the tread contains no silica.

Clause 4—The aircraft tire tread, inner liner, and/or sidewall of clauses 2 or 3, wherein the graphene is a graphene plate, wherein the graphene plate is between about 0.5 PHR and about 10.0 PHR.

Clause 5—The aircraft tire tread, inner liner, and/or sidewall of clauses 2-4, wherein the graphene plate has a surface area from about 100 m²/gram to about 250 m²/gram.

Clause 6—The aircraft tire tread, inner liner, and/or sidewall of clauses 2-5, wherein the graphene plate has an oxygen content of less than about 1%.

Clause 7—The aircraft tire tread, inner liner, and/or sidewall of clauses 2-6, wherein the thickness is less than about 1 nm and the aspect ratio is about 1000.

Clause 8—The aircraft tire tread, inner liner, and/or sidewall of clauses 2-7, wherein the graphene plate is between about 0.5 PHR and about 8.0 PHR.

Clause 9—The aircraft tire tread, inner liner, and/or sidewall of clauses 2-8, wherein the truck tire tread further includes carbon black.

Clause 10—The aircraft tire tread, inner liner, and/or sidewall of clauses 2-9, wherein the truck tire tread further includes a peptizer, aliphatic hydrocarbon resin, treated distillate aromatic extract, an antiozonant, and an antioxidant.

Clause 11—The aircraft tire tread, inner liner, and/or sidewall of clauses 2-10, wherein the truck tire tread further includes paraffinic wax, microcrystalline wax, zinc oxide, stearic acid, an accelerator, sulfur, and a pre vulcanization inhibitor.

Clause 12—The aircraft tire tread, inner liner, and/or sidewall of clauses 10 or 11, wherein the antiozonant is N-(1,3-dimethylbutyl)-N'-phenyl-1,4-benzenediamine and the antioxidant is 2,2,4-trimethyl-1,2-dihydroquinoline.

Clause 13—The aircraft tire tread, inner liner, and/or sidewall of clauses 11 or 12, wherein the accelerator is N-tert-butyl-benzothiazole sulfonamide and the peptizer is 2,2'-dibenzamido-diphenyldisulphide.

Clause 14—The aircraft tire tread, inner liner, and/or sidewall of clauses 2-13, wherein the graphene plate is between about 1.0 PHR and about 2.0 PHR, wherein the composition has no clay fillers.

Clause 15—The aircraft tire tread, inner liner, and/or sidewall of clauses 2-14, wherein the graphene plate is between about 3.0 PHR and about 5.0 PHR.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

We claim:

1. An aircraft tire component comprising:
   natural rubber;
   a peptizer;
   carbon black;
   graphene, wherein the graphene has a thickness of less than about 3.2 nm, a particle size of between about 50 nm and about 10 μm, and contains greater than about 95% carbon;
   aliphatic hydrocarbon resin;
   treated distillate aromatic extract;
   N-(1,3-dimethylbutyl)-N'-phenyl-1,4-benzenediamine;
   2,2,4-trimethyl-1,2-dihydroquinoline;
   paraffinic wax;
   microcrystalline wax;
   zinc oxide;
   stearic acid;
   N-tert-butyl-benzothiazole sulfonamide;
   sulfur; and
   pre vulcanization inhibitor, wherein the aircraft tire component is chosen from the group consisting of a tread, an inner liner, and a sidewall.

2. An aircraft tire component comprising:
   rubber;
   carbon black; and
   graphene, wherein the graphene has a thickness of less than about 3.2 nm, a particle size of between about 50 nm and about 10 μm, and contains greater than about 95% carbon, wherein the aircraft tire component is chosen from the group consisting of a tread, an inner liner, and a sidewall.

3. The aircraft tire component of claim 2, wherein the component contains no silica.

4. The aircraft tire component of claim 2, wherein the graphene is a graphene plate, wherein the graphene plate is present in the amount of between about 0.5 PHR and about 10.0 PHR.

5. The aircraft tire component of claim 4, wherein the graphene plate has a surface area from about 100 m²/gram to about 250 m²/gram.

6. The aircraft tire component of claim 5, wherein the graphene plate has an oxygen content of less than about 1%.

7. The aircraft tire component of claim 2, wherein the thickness of the graphene plate is less than about 1 nm and the aspect ratio of the graphene plate is about 1000.

8. The aircraft tire component of claim 4, wherein the graphene plate is present in the amount of between about 0.5 PHR and about 8.0 PHR.

9. The aircraft tire component of claim 2, wherein the aircraft tire component further comprises carbon black.

10. The aircraft tire component of claim 9, wherein the aircraft tire component further comprises:
    a peptizer;
    aliphatic hydrocarbon resin;
    treated distillate aromatic extract;
    an antiozonant; and,
    an antioxidant.

11. The aircraft tire component of claim 10, wherein the aircraft tire component further comprises:
    paraffinic wax;
    microcrystalline wax;
    zinc oxide;
    stearic acid;
    an accelerator;
    sulfur; and
    a pre vulcanization inhibitor.

12. The aircraft tire component of claim 11, wherein the antiozonant is N-(1,3-dimethylbutyl)-N'-phenyl-1,4-benzenediamine and the antioxidant is 2,2,4-trimethyl-1,2-dihydroquinoline.

13. The aircraft tire component of claim 12, wherein the accelerator is N-tert-butyl-benzothiazole sulfonamide and the peptizer is 2,2'-dibenzamido-diphenyldisulphide, wherein the rubber is natural rubber or butyl rubber.

14. The aircraft tire component of claim 8, wherein the graphene plate is present in the amount of between about 1.0 PHR and about 2.0 PHR, wherein the composition has no clay fillers.

15. The aircraft tire component of claim 8, wherein the graphene plate is present in the amount of between about 3.0 PHR and about 5.0 PHR.

* * * * *